(No Model.)
H. G. FISKE.
Lawn Mower.
No. 233,494. Patented Oct. 19, 1880.
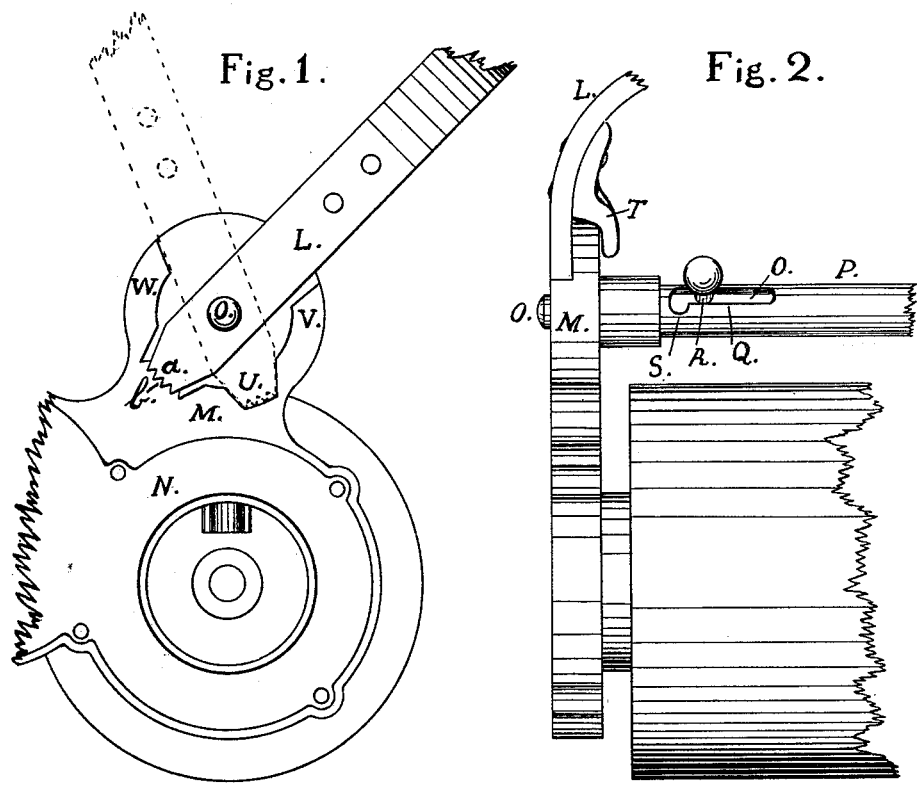
Witnesses:
Frank B. Coleman,
Waldo A. Loud.
Inventor:
Henry G. Fiske.

UNITED STATES PATENT OFFICE.

HENRY G. FISKE, OF SPRINGFIELD, MASSACHUSETTS.

LAWN-MOWER.

SPECIFICATION forming part of Letters Patent No. 233,494, dated October 19, 1880.

Application filed August 26, 1880. (No model.)

*To all whom it may concern:*

Be it known that I, HENRY G. FISKE, a citizen of the United States, residing at Springfield, in the county of Hampden and State of Massachusetts, have invented new and useful Improvements in Lawn-Mowers, of which the following is a specification.

My invention relates to improvements in machines for cutting grass upon lawns; and the objects of my improvements are, first, to adapt the handle of the mower to be quickly removed or applied at pleasure; second, to adapt it to be applied at one of several angles to suit the operator; and, third, to prevent its being sprung off while crowding hard upon it. I attain these objects by the mechanism illustrated in the accompanying drawings, in which—

Figure 1 is an end view of a portion of the gear case and frame of a lawn-mower, and also of the actuating-roller, and shows a portion of the handle-iron applied near the top. Fig. 2 is a rear view of Fig. 1, showing only a section of the roller and of the top brace.

Similar letters refer to similar parts throughout the several views.

The lower portion of the handle, where it joins the machine, is made of a fork shape, and terminates in two iron branches, similar to L, one on each end of the machine. In Fig. 1 one of these branches L is shown overlapping the end of the frame M, which latter, in the present instance, is made solid with the gear-case N.

The lower end of L is provided with teeth *a*, which fit into corresponding ones, *b*, in the frame M, and is held in place by these and the aid of the sliding bolt O, the latter being fitted within the top brace, P, which is provided with the slot Q, through which passes a pin, R, having a knob at its outer end to catch hold of.

The pin is fitted securely into the bolt, and is adapted to be moved within the limits of the slot and carry with it the bolt O. The enlargement of the slot at S is to allow the pin R to drop into and lock the bolt in place.

The overlapping arm T is secured to L to prevent it from springing off of the bolt O and the teeth *b*, which otherwise would be liable to occur when crowding hard upon the handle. The teeth *b* are more in number than *a*, that L may be secured at different angles.

The opening U is provided that the handle may be there secured (as shown by the dotted line) in a forward position for the purpose of tilting up the cutters from the ground during transportation.

The two branches L, one at each end of the machine, are similarly secured in the above-described manner; and to remove the handle simply push the bolts O toward each other and the handle is free to be removed, or it may be inserted at *a* in a different position and the bolts returned to place, and the handle is again firmly secured.

The projections V and W are employed merely to aid in guiding L into place.

It will be seen from the foregoing that it is not absolutely necessary to have the teeth *b* and opening U at the lower end of L beneath the bolt O; but they may be applied to the top of the frame M, and the teeth *a* may be applied to or made part of the arm T; then all will work practically as well as before, but do not present quite as neat an appearance; and it will further be seen that, instead of having several teeth in both L and M, precisely the same results are obtained by providing one with a single tooth, while the opposite has two or more, to adapt the handle to be located at one of several angles; but, of course, a single tooth is not as durable as several, and therefore I prefer the latter.

Having thus described my invention, what I claim as new, and desire to secure by Letters Patent, is—

1. The combination of the handle-iron L with the sliding bolt O, which adapts it to be instantly applied or removed, substantially as shown and described.

2. The sliding bolt O, in combination with the branch L, when the latter is provided with one or more teeth, adapting it to fit into or upon a similar tooth or teeth applied to the frame M, all being arranged to adapt the handle to be applied to the machine and secured in an instant at one of several angles, to suit the convenience of the operator, substantially as shown and described.

3. The combination of the handle-iron L with the securing-arm T, which prevents L from springing off of the frame M, substantially as shown and described.

HENRY G. FISKE.

Witnesses:
FRANK B. COLEMAN,
WALDO A. LOWD.